United States Patent
Kumar et al.

(10) Patent No.: US 8,825,563 B1
(45) Date of Patent: *Sep. 2, 2014

(54) SEMI-SUPERVISED AND UNSUPERVISED GENERATION OF HASH FUNCTIONS

(75) Inventors: Sanjiv Kumar, Brooklyn, NY (US); Jun Wang, New City, NY (US)

(73) Assignee: Google Inc., Mountain View, CA (US)

( * ) Notice: Subject to any disclaimer, the term of this patent is extended or adjusted under 35 U.S.C. 154(b) by 501 days.

This patent is subject to a terminal disclaimer.

(21) Appl. No.: 13/184,013

(22) Filed: Jul. 15, 2011

Related U.S. Application Data

(63) Continuation of application No. 13/103,992, filed on May 9, 2011, now Pat. No. 8,510,236.

(60) Provisional application No. 61/332,603, filed on May 7, 2010.

(51) Int. Cl.
*G06F 15/18* (2006.01)
*G06N 99/00* (2010.01)

(52) U.S. Cl.
CPC .................................. *G06N 99/005* (2013.01)
USPC ........................................................ 706/12

(58) Field of Classification Search
CPC ............. G06K 9/00744; G06K 9/6232; H04L 9/3236; G06F 17/3033; G06F 17/30949; G06N 99/005; G06N 3/004; G06N 3/0436
See application file for complete search history.

(56) References Cited

U.S. PATENT DOCUMENTS

| | | | |
|---|---|---|---|
| 7,617,231 B2 * | 11/2009 | Moon et al. .......................... | 1/1 |
| 8,510,236 B1 | 8/2013 | Kumar et al. | |
| 8,583,567 B1 | 11/2013 | Kumar et al. | |
| 2008/0037877 A1 * | 2/2008 | Jia et al. ......................... | 382/224 |
| 2008/0133496 A1 * | 6/2008 | Kanungo et al. ................... | 707/5 |
| 2010/0332812 A1 * | 12/2010 | Burger et al. ................. | 712/239 |
| 2012/0143853 A1 * | 6/2012 | Gordo et al. ................... | 707/723 |

OTHER PUBLICATIONS

Wang et al., "Sequential Projection Learning for Hashing with Compact Codes", Jun. 2010, International Conference of Machine Learning, pp. 1-8.*
Torralba et al., Small codes and large image databases for recognition, In Proc. of CVPR, pp. 1-8, 2008.*
Gionis et al., Similarity search in high dimensions via hashing, In Proc. of 25th VLDB, 1999.*
Pinto et al., "Feature Selection on the Web People Search task ," CONACYT #106625, 2009, 9 pages.
Fergus et al., "Semi-supervised Learning in Gigantic Image Collections," Advances in Neural Information Processing Systems (NIPS), 2006, 1-9.

* cited by examiner

*Primary Examiner* — Jeffrey A Gaffin
*Assistant Examiner* — Paulinho E Smith
(74) *Attorney, Agent, or Firm* — Fish & Richardson P.C.

(57) ABSTRACT

Methods, systems, and apparatus, including computer programs encoded on computer storage media, for generating hash functions. In one aspect, a method includes generating hash functions by sequentially determining a weight vector for each hash function to maximize an accuracy measure derived from current constraint weights and updating the current constraint weights for use in calculating a weight vector of a next hash function in the sequence. In another aspect, the determined weight vector maximizes an accuracy measure and a variance measure. In still another aspect, a method includes generating an adjusted covariance matrix and generating a sequence of hash functions from the adjusted covariance matrix. In still another aspect, a method includes sequentially generating a sequence of hash functions, where the weight vectors for any previously generated hash functions are used to identify constraints used to generate the weight vector for each next hash function in the sequence.

33 Claims, 7 Drawing Sheets

SEMI-SUPERVISED AND UNSUPERVISED GENERATION OF HASH FUNCTIONS

CROSS-REFERENCE TO RELATED APPLICATIONS

This application is a continuation application of and claims priority to U.S. application Ser. No. 13/103,992, filed on May 9, 2011 entitled "SEMI-SUPERVISED AND UNSUPERVISED GENERATION OF HASH FUNCTIONS," and claims the benefit of priority from U.S. Provisional Application Ser. No. 61/332,603, filed on May 7, 2010 entitled "SEMI-SUPERVISED AND UNSUPERVISED GENERATION OF HASH FUNCTIONS," the entirety of which is hereby incorporated by reference.

BACKGROUND

This specification relates to generating hash functions for use in nearest neighbor search.

Nearest neighbor search identifies a group of items that are most similar to a given item in a feature space. Each of the items is represented by a feature vector in the feature space. One method for performing nearest neighbor search uses binary hashing to map the features of an item to a Hamming code in a Hamming space, i.e., a sequence of ones and zeros, and then compares the resulting Hamming codes. Good binary hashing functions map items that are similar in the original space to similar Hamming codes and map items that are dissimilar in the original space to dissimilar Hamming codes.

A K-bit Hamming code is generated for an item using a sequence of K hash functions, each of which specifies the value of one bit in the Hamming code. Various methods, for example, Locality Sensitive Hashing, Shift-Invariant Kernel-based Hashing, and Spectral Hash have previously been used to determine appropriate hash functions.

However, these methods do not always generate good short Hamming codes; e.g., when K is small, there is not often good discrimination in the resulting Hamming codes. While longer codes have better discrimination than short codes, longer codes also require more storage overhead and more computation time than shorter codes.

SUMMARY

In general, one innovative aspect of the subject matter described in this specification can be embodied in methods that include the actions of storing a plurality of training examples and a plurality of constraints for the training examples, wherein, for one or more constrained training examples in the plurality of training examples, there is at least one constraint in the plurality of constraints, and the constraint either identifies a particular other training example in the plurality of training examples as a neighbor of the training example or identifies a particular other training example in the plurality of training examples as a non-neighbor of the training example; initializing a current constraint weight for each of the constraints to a respective initial value; generating an ordered sequence of hash functions, wherein each hash function defines a mapping of features of an item to a bit in a corresponding ordered sequence of bits, wherein the hash function for a particular bit determines the value of the particular bit according to a respective weight vector for the hash function, wherein generating the sequence of hash functions comprises sequentially determining the weight vector for each hash function, and wherein determining the weight vector for a current hash function in the sequence comprises: determining the weight vector for the current hash function, wherein the determined weight vector maximizes an accuracy measure, wherein the accuracy measure is derived from a number of constraints satisfied by the weight vector and a number of constraints not satisfied by the weight vector and the current constraint weight of each constraint; and updating the current constraint weights for use in calculating a weight vector of a next hash function in the sequence, wherein the current constraint weights are updated to increase a magnitude of the current constraint weight of any constraint not satisfied by the determined weight vector for the current hash function; and storing the determined weight vectors in a data store. Other embodiments of this aspect include corresponding systems, apparatus, and computer programs recorded on computer storage devices, each configured to perform the operations of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The accuracy measure is derived from a sum of the current constraint weights not satisfied by the weight vector subtracted from a sum of the current constraint weights satisfied by the weight vector. Determining the weight vector for the current hash function comprises determining an eigenvector for a matrix of the form $X_I S_k X_I^T$, wherein $X_I$ is a matrix of feature vectors of the constrained training examples and $S_k$ is a matrix of the current constraint weights. Determining the eigenvector comprises extracting a first eigenvector. Determining the eigenvector comprises determining an approximate eigenvector. The determined weight vector for the current hash function further maximizes a variance in projections resulting from applying the determined weight vector to the plurality of training examples. The plurality of training examples includes one or more unconstrained training examples for which there is no constraint in the plurality of constraints. Determining the weight vector for the current hash function further comprises, after the weight vector is determined, updating the plurality of training examples to be a residual calculated using the determined weight vector. The residual is calculated by removing a contribution of a subspace of the training examples spanned by the determined weight vector. The residual satisfies the equation $X - w_k w_k^T X$, wherein X is a matrix of feature vectors of the plurality of training examples and $w_k$ is the determined weight vector for the current hash function.

Determining the weight vector for the current hash function comprises determining an eigenvector for a matrix of the form $X_I S_k X_I^T + \eta X X^T$, wherein $X_I$ is a matrix of feature vectors of the constrained training examples, $S_k$ is a matrix of the current constraint weights, and X is a matrix of feature vectors of the plurality of training examples. Determining the eigenvector comprises extracting a first eigenvector. Determining the eigenvector comprises determining an approximate eigenvector. Updating the current constraint weights comprises updating the current constraint weights to be $S_k - \alpha T$ $(\tilde{S}^k, S_k)$, where $S_k$ is a matrix of the current constraint weights, $\tilde{S}^k$ measures a signed magnitude of pairwise relationships of projections of the one or more constrained training examples using the determined weight vector, and the function T is a truncated gradient of $\tilde{S}^k$. $\tilde{S}^k = X_I^T w_k w_k^T X_I$, wherein $X_I$ is a matrix of feature vectors of the constrained training examples and $w_k$ is the determined weight vector for the current hash function. The actions further include performing a nearest neighbor search using the weight vectors stored in the data store.

In general, another innovative aspect of the subject matter described in this specification can be embodied in methods that include the actions of storing a plurality of constrained training examples, a plurality of first training examples, and a plurality of constraints for the constrained training examples, wherein, for each constrained training example, there is at least one constraint in the plurality of constraints, and the constraint either identifies a particular other constrained training example as a neighbor of the constrained training example or identifies a particular other constrained training example as a non-neighbor of the constrained training example, wherein the plurality of first training examples is initialized to include the constrained training examples and one or more unconstrained training examples for which there is no constraint in the plurality of constraints; generating an ordered sequence of hash functions, wherein each hash function defines a mapping of features of an item to a corresponding bit in an ordered sequence of bits, wherein the hash function for a particular bit determines the value of the particular bit according to a respective weight vector for the hash function, wherein generating the sequence of hash functions comprises sequentially determining the weight vector for each hash function, and wherein determining the weight vector for a current hash function in the sequence comprises: determining the weight vector for the current hash function, wherein the determined weight vector for the current hash function maximizes an accuracy measure derived from a number of constraints satisfied by the weight vector and a number of constraints not satisfied by the weight vector, and wherein the weight vector for the current hash function maximizes a variance of the values generated by the hash function when the hash function is applied to the first training examples; identifying one or more first training examples to remove from the plurality of first training examples according to the determined weight vector; and updating the plurality of first training examples for use in calculating the weight vector for the next hash function in the sequence, wherein the updating comprises calculating a residual of the first training examples according to the determined weight vector; and storing the determined weight vectors in a data store. Other embodiments of this aspect include corresponding systems, apparatus, and computer programs recorded on computer storage devices, each configured to perform the operations of the methods.

These and other embodiments can each optionally include one or more of the following features. Determining the weight vector for the current hash function comprises determining an eigenvector for a matrix of the form $X_I S_k X_I^T + \eta X X^T$, wherein $X_I$ is a matrix of feature vectors of the constrained training examples, $S_k$ is a matrix of the current constraint weights, and X is a matrix of feature vectors of the plurality of training examples. Determining the eigenvector comprises extracting a first eigenvector. Determining the eigenvector comprises determining an approximate eigenvector. The accuracy measure is further derived from a current constraint weight for each constraint, and determining the weight vector for the current hash function further comprises, after the weight vector is determined, updating the current constraint weights to increase a magnitude of the current constraint weight of any constraint not satisfied by the determined weight vector for the current hash function. The accuracy measure is derived from a sum of the current constraint weights not satisfied by the weight vector subtracted from a sum of the current constraint weights satisfied by the weight vector. Updating the current constraint weights comprises updating the current constraint weights to be $S_k - \alpha T(\tilde{S}^k, S_k)$, where $S_k$ is a matrix of the current constraint weights, $\tilde{S}^k$ measures a signed magnitude of pairwise relationships of projections of the one or more constrained training examples using the determined weight vector, and the function T is a truncated gradient of $\tilde{S}^k$. $\tilde{S}^k = X_I^T w_k w_k^T X_I$, wherein $X_I$ is a matrix of feature vectors of the constrained training examples and $w_k$ is the determined weight vector for the current hash function. The actions further include performing a nearest neighbor search using the weight vectors stored in the data store.

In general, another innovative aspect of the subject matter described in this specification can be embodied in methods that include the actions of storing a plurality of constrained training examples, a plurality of first training examples, and a plurality of constraints for the constrained training examples, wherein, for each constrained training example, there is at least one constraint in the plurality of constraints, and the constraint either identifies a particular other constrained training example as a neighbor of the constrained training example or identifies a particular other constrained training example as a non-neighbor of the constrained training example, wherein the plurality of first training examples is initialized to include the constrained training examples and one or more non-constrained training examples for which there is no constraint in the plurality of constraints; generating an adjusted covariance matrix from the plurality of constrained training examples, the plurality of first training examples, and the plurality of constraints, wherein the adjusted covariance matrix is generated by adding an accuracy term and a regularizer term, wherein the accuracy term is derived from the constrained training examples and the constraints, and wherein the regularizer term represents variance in projections that result from applying a weight vector to the first training examples; and generating an ordered sequence of hash functions from the adjusted covariance matrix, wherein each hash function defines a mapping of features of an item to a corresponding bit in an ordered sequence of bits, wherein the hash function for a particular bit determines the value of the particular bit according to a respective weight vector for the hash function. Other embodiments of this aspect include corresponding systems, apparatus, and computer programs recorded on computer storage devices, each configured to perform the operations of the methods.

These and other embodiments can each optionally include one or more of the following features. The accuracy term corresponds to an accuracy measure derived from a number of constraints satisfied by the weight vector, a number of constraints not satisfied by the weight vector, and a constraint weight for each constraint. The accuracy term is $X_I S_k X_I^T$, the regularizer term is $\eta X X^T$, and the adjusted covariance matrix is derived by adding the accuracy term and the regularizer term, wherein, wherein $X_I$ is a matrix of feature vectors of the constrained training examples, $S_k$ is a matrix of the constraint weights, and X is a matrix of feature vectors of the plurality of training examples. Generating an ordered sequence of hash functions from the adjusted covariance matrix comprises determining a weight vector for each hash function in the sequence of hash functions by determining one eigenvector for the adjusted covariance matrix for each hash function in the sequence of hash functions. Determining the eigenvectors comprises extracting eigenvectors from the adjusted covariance matrix. Determining the eigenvectors comprises determining approximate eigenvectors. Generating an ordered sequence of hash functions from the adjusted covariance matrix comprises sequentially determining a weight vector for each hash function in the sequence of hash functions. Generating an ordered sequence of hash functions from the adjusted covariance matrix comprises selecting a weight vector for each hash function so that a matrix of the selected weight vectors W optimizes the equation $$Q(W) = \frac{1}{2} tr\{W^T [X_l S X_l^T + \eta X X^T] W\},$$

where $X_l$ is a matrix of feature vectors of the constrained training examples, S is a matrix of constraint weights, and X is a matrix of feature vectors of the plurality of training examples.

The actions further include performing a nearest neighbor search using the ordered sequence of hash functions.

In general, another innovative aspect of the subject matter described in this specification can be embodied in methods that include the actions of storing a plurality of training examples; generating a sequence of hash functions, wherein each hash function defines a mapping of features of an item to a bit in a corresponding ordered sequence of bits, wherein the hash function for a particular bit determines the value of the particular bit according to a respective weight vector, wherein generating the hash function comprises sequentially determining the weight vectors for each hash function, and wherein determining the weight vector for a current hash function in the sequence after a weight vector for at least one previously determined hash function has been determined comprises: determining the weight vector for the current hash function, wherein the determined weight vector maximizes an accuracy measure derived from a respective set of constraints generated for all previously determined hash functions; selecting a plurality of pseudo-neighbor pairs of training examples and a plurality of pseudo-non-neighbor pair of training examples for use in determining the weight vector for a next hash function in the sequence, wherein the pseudo-neighbor pairs of training examples and the pseudo-non-neighbor pairs of training examples are selected according to the determined weight vector; and generating a group of constraints for the current hash function, wherein the generated constraints reflect the selected pseudo-neighbor pairs of training examples and the selected pseudo-non-neighbor pairs training examples; and storing the determined weight vectors in a data store. Other embodiments of this aspect include corresponding systems, apparatus, and computer programs recorded on computer storage devices, each configured to perform the operations of the methods.

These and other embodiments can each optionally include one or more of the following features. Determining the weight vector for the current hash function comprises determining an eigenvector for a matrix of the form $$\sum_{i=0}^{k-1} \lambda^{k-1} X_{MC}^i S_{MC}^i X_{MC}^{iT},$$

wherein for each value of i, $S_{MC}^i$ is a matrix corresponding to the constraints generated from the weights for the hash function i and $X_{MC}^i$ is a pseudo-constrained training example matrix that includes all of the training examples that are in either in the plurality of pseudo-neighbor pairs of training examples or the plurality of pseudo-non-neighbor pairs of training examples identified for the hash function i. Determining the eigenvector comprises extracting a first eigenvector. Determining the eigenvector comprises determining an approximate eigenvector. The determined weight vector for the current hash function further maximizes a variance in projections resulting from applying the determined weight vector to the plurality of training examples. Determining the weight vector for the current hash function comprises determining an eigenvector for a matrix of the form $$M_k = \sum_{i=0}^{k-1} \lambda^{k-1} X_{MC}^i S_{MC}^i X_{MC}^{iT} + \eta X X^T,$$

wherein for each value of i, $S_{MC}^i$ is a matrix corresponding to the constraints generated from the weights for the hash function i and $X_{MC}^i$ is a pseudo-constrained training example matrix that includes all of the training examples that are in either in the plurality of pseudo-neighbor pairs of training examples or the plurality of pseudo-non-neighbor pairs of training examples identified for the hash function i, and wherein X is a matrix of feature vectors for all of the training examples in the plurality of training examples. Determining the eigenvector comprises extracting a first eigenvector. Determining the eigenvector comprises determining an approximate eigenvector. Determining the weight vector for the current hash function further comprises, after the weight vector is determined, updating the plurality of training examples to a residual value, given the determined weight vector. The residual is calculated by removing a contribution of a subspace of the training examples spanned by the determined weight vector. The residual satisfies the equation $X - w_k w_k^T X$, wherein X is a matrix of feature vectors of the plurality of training examples and $w_k$ is the determined weight vector for the current hash function. The actions further include performing a nearest neighbor search using the weight vectors stored in the data store.

Particular embodiments of the subject matter described in this specification can be implemented so as to realize one or more of the following advantages. A sequence of hash functions can be generated using data dependent projections. This results in good discrimination from even short Hamming codes. Short Hamming codes can be used to represent items. This leads to fast retrieval and low storage requirements. The meaning of short is generally relative to the dimensions of the feature vectors of the training data. For example, if the each item in the training data is represented by a vector of 128 features, a Hamming code of 64 bits is short. However, short is defined differently for other dimensionalities.

A sequence of hash functions can be generated so that each next hash function in the sequence is generated to compensate for errors that result from applying the previous hash function in the sequence. Hash functions can be generated in supervised, semi-supervised, and unsupervised training environments. Overfitting of hash functions can be avoided. Other features, aspects, and advantages of the subject matter will become apparent from the description, the drawings, and the claims.

The details of one or more embodiments of the subject matter described in this specification are set forth in the accompanying drawings and the description below.

BRIEF DESCRIPTION OF THE DRAWINGS

Like reference numbers and designations in the various drawings indicate like elements.

DETAILED DESCRIPTION

Figure 1:
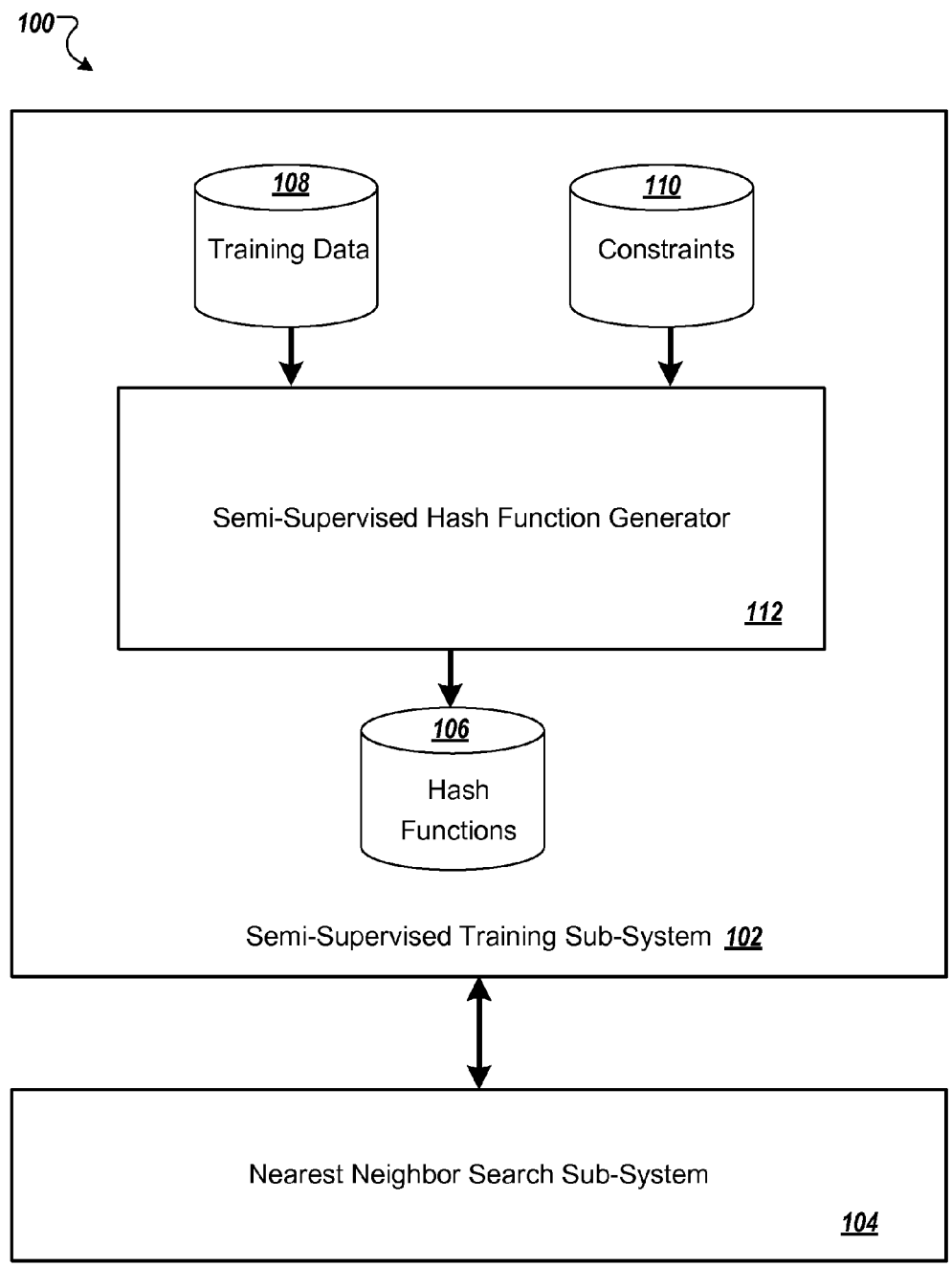
FIG. 1 is a block diagram of an example system, including a semi-supervised training sub-system and a nearest neighbor search sub-system.

FIG. 1 is a block diagram of an example system 100, including a semi-supervised training sub-system 102 and a nearest neighbor search sub-system 104. The system 100 is implemented in one or more computers.

The semi-supervised training system 102 generates an ordered sequence of hash functions 106. The ordered sequence of hash functions 106 specifies a mapping from features of an item to a corresponding ordered sequence of bits, i.e., a sequence of ones and zeros. Each hash function in the sequence of hash functions 106 is represented by a weight vector that defines a mapping of features of an item to a single bit in the sequence of bits.

Each hash function $h_k$ in the sequence of hash functions 106 has the form: $h_k(X) = \text{sgn}(w_k^T x + b_k)$, where x is a vector of features for the item being hashed, $w_k$ is the weight vector for the hash function $h_k$, and $b_k$ is a threshold. The signum function sgn(•) returns −1 if the argument is negative and 1 if the argument is positive. For simplicity, if the features of the items for which hash values are being calculated are normalized to have a zero mean, the hash function can be rewritten as: $h_k(x) = \text{sgn}(w_k^T x)$. Thus, each hash function $h_k$ is defined by its weight vector $w_k$.

The above formulations of the hash function give values that are either 1 or −1. The corresponding bit $y_k(x)$ for the hash function can be calculated from $h_k(x)$ as follows:

$$y_k(x) = \frac{(1 + h_k(x))}{2} \text{ or } y_k(x) = \frac{(1 - h_k(x))}{2}.$$

Other formulations of the hash function and techniques for determining the bit value can also be used. For example, the hash function can have more than two output values. In some implementations, the hash function is a continuous function, and the bit value is determined by comparing the output of the hash function to a predetermined threshold.

The nearest neighbor search sub-system 104 uses the hash functions 106 to generate a hash values from the features of the items and then generates appropriate bits corresponding to the hash values. This binary hashing maps a feature vector of an item to a particular location in a Hamming space, so that close neighbors in the original space have similar codes in the Hamming space, e.g., similar strings of bits. Once the features of the items are mapped to the Hamming space, the nearest neighbors, or approximate nearest neighbors, can be efficiently determined by comparing the strings of bits to identify similar strings. For example, conventional methods for determining nearest neighbors or approximate nearest neighbors can be used.

The nearest neighbor search performed by the nearest neighbor search sub-system can be used in various applications. For example, in some implementations, the nearest neighbor search sub-system can identify a group of images that are estimated to have the most similar visual features to the features of a particular image. For example, the nearest neighbor search can be used to identify a group of images estimated to be the most similar to an image input as an image query by a user. In these implementations, the items are images and the features are visual features, for example colors, shapes, lines, and edges. The nearest neighbor search sub-system 104 maps the features of each image to a Hamming space using the stored hash functions 106 and compares the representations of the image features in the Hamming space. The nearest neighbor search sub-system uses similarity of the images in the Hamming space as a surrogate for actual similarity.

As another example, in some implementations, the nearest neighbor search sub-system can identify a group of videos that are estimated to have the most similar features to the features of a particular video. For example, if a user is currently viewing a particular video, the nearest neighbor search sub-system can be used to identify videos that have similar features, and these identified videos can be presented to the user. In these implementations, the items are videos and the features are video features, for example, visual features, motion features, and audio features. The nearest neighbor search sub-system 104 maps the features of each video to a Hamming space using the stored hash functions 106 and compares the representations of the video features in the Hamming space. Similarity of the features in the Hamming space is used as a surrogate for actual similarity.

As yet another example, in some implementations, the nearest neighbor search sub-system can identify a group of documents that are estimated to have the most similar features to the features of a particular document. For example, if a user is currently viewing a particular document, the nearest neighbor search sub-system can be used to identify documents that have similar features, and these identified documents can be presented to the user. As another example, the nearest neighbor search sub-system can compare the features of documents to identify documents that have very similar features, and then only include one document from each group of documents with similar features in an index of documents. In these implementations, the items are documents and the features are document features, for example, textual features. The nearest neighbor search sub-system 104 maps the features of each document to a Hamming space using the stored hash functions 106 and compares the representations of the document features in the Hamming space. Similarity of the features in the Hamming space is used as a surrogate for actual similarity.

The semi-supervised training sub-system 102 generates the ordered sequence of hash functions 106 from stored training data 108 and stored constraints on the training data 110. The training data 108 is made up of training examples. Each training example corresponds to an item of a particular type. For example, each training example can be a feature vector corresponding to features of an item.

In some implementations, all of the training examples correspond to items of the same type. For example, the training examples can all correspond to images, all correspond to videos, all correspond to documents, all correspond to users, or all correspond to another type of data.

The constraints 110 specify one or more constraints on the training data. Each constraint identifies a pair of training examples in the training data 108 as neighbors, or identifies a pair of training examples in the training data 108 as non-neighbors. Two training examples are neighbors when they are similar enough to each other to be considered related. For example, two training examples can be neighbors when they have both been assigned the same class label. For example, two images are neighbors if they are both labeled as being pictures of dogs. As another example, two training examples are neighbors when they are neighbors in a feature space, e.g., when they are less than a threshold distance away from each other in the feature space according to a distance measure, e.g., a metric or non-metric distance measure.

The constraints can be derived from pairs of training examples known to be neighbors or non-neighbors, or from pairs of training examples having the same label or different labels.

The constraints 110 do not necessarily include a constraint for every training example in the training data 108. One or more of the training examples in the training data 108 can have no corresponding constraints in the constraints 110. For convenience, in the description below, each training example for which there is at least one constraint in the constraints 110 will be referred to as a "constrained training example," and each training example for which there is no constraint in the constraints 110 will be referred to as an "unconstrained training example."

The semi-supervised training sub-system 102 processes the training data 108 and the constraints 110 to generate the hash functions 106 using a hash function generator 112. The hash function generator 112 generates each hash function in the sequence of hash functions as will be described in more detail below with reference to FIGS. 2-4.

Figure 2:
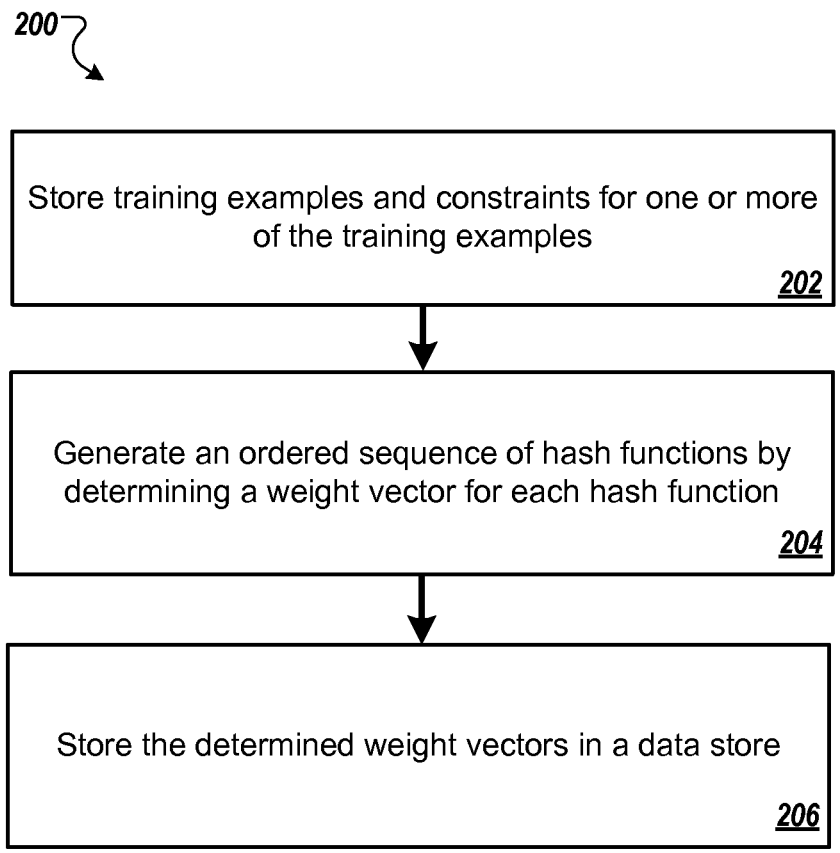
FIG. 2 is a flow chart of an example method for generating a sequence of hash functions in a semi-supervised training environment.

FIG. 2 is a flow chart of an example method 200 for generating a sequence of hash functions in a semi-supervised training environment. For convenience, the example method 200 is described in reference to a system that performs the method 200. The system can be, for example, the semi-supervised training sub-system 102, described above with reference to FIG. 1.

The system stores a plurality of training examples and constraints for the training examples (202), for example, as described above with reference to FIG. 1. In some implementations, the system represents the training examples as a matrix X, where each column of X corresponds to the features of a particular training example.

For one or more of the training examples, there is at least one constraint that identifies a particular other training example as a neighbor of the training example or identifies a particular other training example as a non-neighbor of the training example. For convenience, the constraints will be described as two groups of pairs of training example: M and C, where M is all pairs of training examples $(X_a, X_b)$ that are neighbors, and C is all pairs of training examples $(X_a, X_b)$ that are non-neighbors.

The system generates an ordered sequence of hash functions by determining a weight vector for each hash function (204). Each hash function defines a mapping of features of an item to a bit in a corresponding sequence of bits, as described above with reference to FIG. 1. Two example methods for determining the weight vectors are described in more detail below with reference to FIGS. 3 and 4.

The system stores the determined weight vectors for each hash function in a data store (206).

Figure 3:
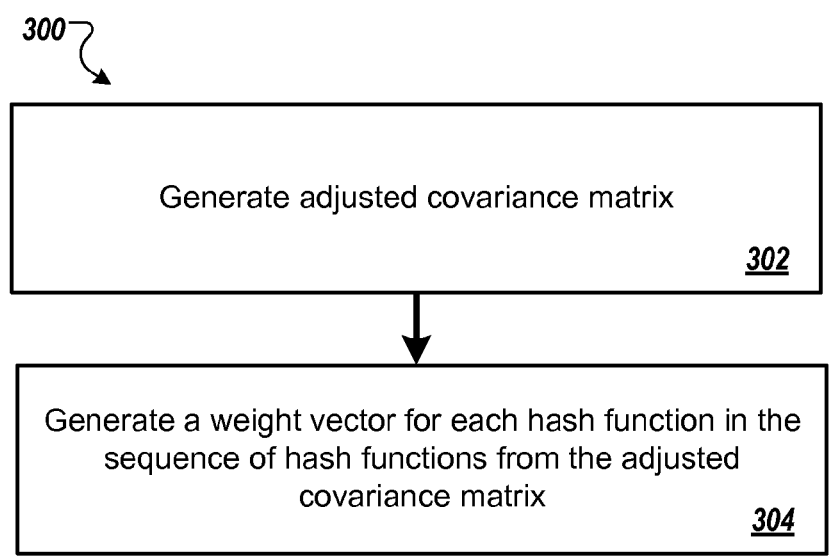
FIG. 3 is a flow chart of an example method for determining a weight vector for each hash function in an ordered sequence of hash functions.

FIG. 3 is a flow chart of an example method 300 for determining a weight vector for each hash function in an ordered sequence of hash functions. For convenience, the example method 300 is described in reference to a system that performs the method 300. The system can be, for example, the semi-supervised training sub-system 102, described above with reference to FIG. 1.

The system generates an adjusted covariance matrix (302) for use in determining the weight vectors. The system generates the adjusted covariance matrix M according to the following formula:

$$M = X_l S X_l^T + \eta X X^T,$$

where $X_l$ is a matrix of the constrained training examples, X is a matrix of all of the training examples, $\eta$ is a scaling factor, described below, and S is a matrix of the constraints, defined as follows:

$$S_{ij} = \begin{cases} 1 : (x_i, x_j) \in M \\ -1 : (x_i, x_j) \in C \\ 0 : \text{otherwise,} \end{cases}$$

where $S_{ij}$ is the ith row and the jth column of the matrix S, and $X_i$ and $X_j$ are the ith and jth training examples in the constrained training example matrix $X_l$, M is the set of pairs of training examples that are neighbors, and C is the set of pairs of training examples that are non-neighbors.

For illustrative purposes, the formulation of the adjusted covariance matrix given above is one in which X has been normalized to have a mean of zero. In implementations where X has not been normalized, the system replaces the X term with $(X-\mu)$, where $\mu$ is the mean of the data represented by X.

The adjusted covariance matrix has two components, an accuracy term $(X_l S X_l^T)$ and a regularizer term $(\eta X X^T)$. The accuracy term reflects the empirical accuracy of the hash function over the constrained training examples. The accuracy term is derived from the constrained training examples and the constraints.

The accuracy term is derived from a measure of the empirical accuracy of a hash function as follows. The empirical accuracy of a sequence of hash functions H is derived from the total number of correctly classified pairs minus the total number of wrongly classified pairs, summed over each bit of the hash function.

The empirical accuracy can be calculated according to the following formula:

$$J(H) = \sum_k \left\{ \sum_{(x_i, x_j) \in M} h_k(x_i) h_k(x_j) - \sum_{(x_i, x_j) \in C} h_k(x_i) h_k(x_j) \right\}$$

where M is the set of pairs of constrained training examples that are neighbors, C is the set of pairs of constrained training examples that are non-neighbors, and $h_k(x)$ is given above.

The objective function J(H) can be modified to replace the sgn( ) function with the signed magnitude, resulting in the following formula:

$$J(W) = \sum_k \left\{ \sum_{(x_i,x_j) \in M} w_k^T x_i x_j^T w_k - \sum_{(x_i,x_j) \in C} w_k^T x_i x_j^T w_k \right\},$$

where $w_k$ is the weight vector for the kth hash function. This modified form takes into account a desire that if two items $x_i$ and $x_j$ are similar, the product of their projections according to the weight vector $w_k$ should have a large value, e.g., greater than zero, and that if two items $x_i$ and $x_j$ are dissimilar, the product of their projections according to the weight vector $w_k$ should have a small value, e.g., less than zero.

J(W) can be further rewritten as follows:

$$J(W) = \frac{1}{2} \sum_k w_k^T X_l S X_l^T w_k = \frac{1}{2} tr\{W^T X_l S X_l^T W\},$$

where $X_l$ is a matrix of the constrained training examples, X is a matrix of all of the training examples, and S is a matrix of the constraints, defined as described above. This final formulation of J(W) is used to generate the accuracy term of the adjusted covariance matrix, described above.

The regularizer term avoids overfitting of the hash function by giving preference to hash directions that maximize the variance of the projected data, e.g., maximize the variance in the projected values resulting from applying the weight vector to the training examples. Unlike the accuracy term, which is derived from just the constrained training examples, the regularizer term is derived from both the constrained training examples and unconstrained training examples.

The system derives the regularizer term from an estimate of the variance of the projections resulting when the weight vector is applied to the training examples, e.g.:

$$R(W) = \frac{1}{\beta} \sum_k E[\|w_k^T x\|^2] = \frac{1}{n\beta} \sum_k w_k^T X X^T w_k,$$

where E is an expected value function, X is a matrix of all of the training examples, n is the number of training examples in matrix X, and β is a positive constant chosen to determine the weight given to R(W) relative to the J(W).

The inverse of the product of n and β can be rewritten as η, leading to the following rewritten version of R(W):

$$R(W) = \eta \sum_k w_k^T X X^T w_k.$$

Combining the empirical accuracy measure J(W) and the variance measure R(W) gives the following equation:

$$Q(W) = \frac{1}{2} tr\{W^T [X_l S X_l^T + \eta X X^T] W\}.$$

The adjusted covariance matrix described above, e.g., $$M = X_l S X_l^T + \eta X X^T,$$

can be derived from the combined equation.

Once the covariance matrix is generated, the system generates a weight vector for each hash function in the sequence of hash functions from the adjusted covariance matrix (304).

The weight vectors are chosen to maximize the accuracy over the constrained training examples and to maximize the variance of the hash function values over both the constrained and the unconstrained training examples.

In some implementations, the system determines the weight vectors by imposing orthogonality constraints on the matrix of weight vectors W, e.g., $W^T W = I$, and extracting the top K eigenvectors from the matrix. Selecting the top K eigenvectors of the covariance matrix as the weight vectors maximizes the accuracy measure J(W) derived from the number of constraints satisfied by the selected weight vectors and also maximizes the variance function R(W).

In other implementations, the system imposes the orthogonality constraints on the matrix of weight vectors and uses iterative methods to compute approximate eigenvectors for the matrix, rather than extracting the top K eigenvectors themselves.

In other implementations, the system does not impose orthogonality constraints, and uses standard numerical optimization methods, for example, gradient descent, to optimize the combined equation Q(W) and determine the matrix of weight vectors W.

In other implementations, the system sequentially determines the weight vectors, as described in more detail below with reference to FIG. 4.

Figure 4:
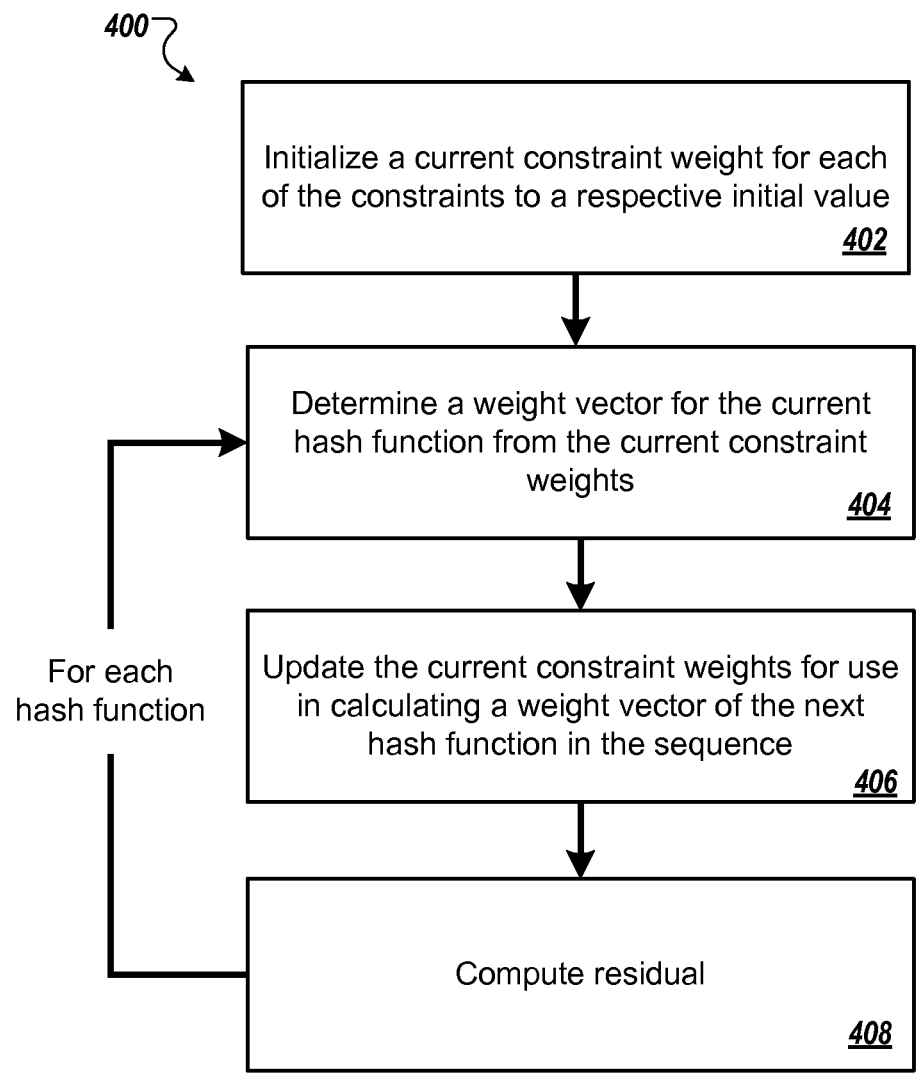
FIG. 4 is a flow chart of an example method for sequentially determining the weight vector for each hash function in an ordered sequence of hash functions.

FIG. 4 is a flow chart of an example method 400 for sequentially determining the weight vector for each hash function in an ordered sequence of hash functions. For convenience, the example method 400 is described in reference to a system that performs the method 400. The system can be, for example, the semi-supervised training sub-system 102, described above with reference to FIG. 1.

The system initializes a current constraint weight for each constraint in a group of stored constraints to a respective initial value (402). In general, the initial values are selected so as to distinguish between constraints that specify two training examples are neighbors and constraints that specify that two training examples are not neighbors. For example, each constraint that specifies that two training examples are neighbors can be initialized to a positive value, e.g., 1, and each constraint that specifies that two training examples are not neighbors can be initialized to a negative value, e.g., −1.

In some implementations, the system represents the current constraint weights as a current constraint weight matrix S. Each row of S corresponds to a constrained training example in a matrix of constrained training examples $X_l$, and each column of S also corresponds to a constrained training example in the matrix $X_l$. The current constraint weights in S are initialized according to the following formula:

$$S_{ij} = \begin{cases} 1 : (x_i, x_j) \in M \\ -1 : (x_i, x_j) \in C \\ 0 : \text{otherwise}, \end{cases}$$

where $S_{ij}$ is the ith row and the jth column of the matrix S, and $X_i$ and $X_j$ are the ith and jth training examples in the constrained training example matrix $X_l$. In some implementations $S_{ii}$ is always assigned a value of 0.

The system then sequentially determines the weight vector for each function in the sequence of hash functions. Because the system sequentially determines the weight vectors, each weight vector can be selected to minimize errors in classification given by the previously selected weight vectors. The system does this by adjusting the constraint weights to account for pairs of constrained training examples that are incorrectly classified by the previously determined weight vector, as described in more detail below.

For each current hash function in the sequence of hash functions, the system does the following. First, the system determines a weight vector for the current hash function from the current constraint weights (404).

The determined weight vector maximizes both an accuracy measure and a variance measure. The accuracy measure is derived from a number of constraints satisfied by the weight vector, the number of constraints violated by the weight vector, and the current constraint weight of the constraints. The variance is a variance of the values generated by the hash function when the hash function is applied to the constrained and unconstrained training examples.

In some implementations, the system determines the weight vector for the current hash function by generating an adjusted covariance matrix using the current constraint weights, and then extracting the first eigenvector from the generated adjusted covariance matrix. When the adjusted covariance matrix has the form:

$$M_k = X_l S_k X_l^T + \eta X X^T,$$

the extracted eigenvector maximizes both the accuracy measure and the variance as a result of the structure of the adjusted covariance matrix. In these implementations, the system implicitly imposes orthogonality constraints on the weight matrix W.

Other formulations of the adjusted covariance matrix can also be used. For example, the system can just use the accuracy term, e.g., $M_k = X_l S_k X_l^T$, in which case the determined weight vector maximizes the accuracy measure but does not necessarily maximize the variance.

In some implementations, rather than extracting the first eigenvector from the adjusted covariance matrix, the system approximates the first eigenvector using an iterative technique. In implementations where the system does not impose orthogonality constraints, the system can alternatively use standard numerical optimization methods to solve for the weight vector.

The system updates the current constraint weights for use in calculating a weight vector of the next hash function in the sequence of hash functions (406). In general, the current constraint weights are updated to increase a magnitude of the current constraint weight of any constraint not satisfied by the determined weight vector for the current hash function. A constraint is not satisfied if the results of applying the hash function for the weight vector to the two constrained training examples lead to a different classification than the classification specified by the constraint. In other words, a constraint is not satisfied if the results of the current hash function applied to two training examples are different, and the constraint specifies that the pair of training examples are neighbors. Similarly, a constraint is not satisfied if the results of the current hash function applied to two training examples is the same, and the constraint specifies that the pair of training examples are non-neighbors.

In some implementations, the system updates the constraint weights according to the following formula:

$$S_{k+1} = S_k - \alpha T(\tilde{S}^k, S_k),$$

where $S_{k+1}$ are the updated constraint weights, $S_k$ are the current constraint weights, $\tilde{S}^k$ measures the signed magnitude of pairwise relationships of the projections of $X_l$ using the weight vector $w_k$, and the function T is the truncated gradient of $\tilde{S}^k$.

$\tilde{S}^k$ is derived as follows: $\tilde{S}^k = X_l^T w_k w_k^T X_l$.

$T(\tilde{S}_{i,j}^k, S_{i,j})$ is derived as follows:

$$T(\tilde{S}_{i,j}^k, S_{i,j}) = \begin{cases} (\tilde{S}_{i,j}^k : \mathrm{sgn}(\tilde{S}_{i,j}^k \cdot S_{ij}) < 0 \\ 0 : \mathrm{sgn}(\tilde{S}_{i,j}^k \cdot S_{ij}) \geq 0. \end{cases}$$

The condition $\tilde{S}_{i,j}^k \cdot S_{ij} < 0$ for a pair $(x_i, x_j)$ indicates that the weight vector for the current hash function does not satisfy a constraint on training examples $x_i$ and $x_j$. For each such violation, the current constraint weight $S_{i,j}$ is updated as:

$$S_{i,j} = S_{i,j} - \alpha \tilde{S}_{i,j}^k,$$

where $\alpha$ is a step size. In some implementations, $\alpha$ is chosen so that a is less than one divided by $\beta$, where $\beta = \max_i \|x_i\|^2$. This ensures that $\alpha \tilde{S}_{i,j}^k < 1$, leading to numerically stable updates.

For unconstrained pairs of constrained training examples, and for pairs of constrained training examples for which the current hash function produces the correct results, the system does not change the current constraint weight $S_{ij}$. Thus, those labeled pairs for which the current hash function does not predict the bits correctly exert more influence on the generating of the next hash function.

The system computes the residual of the constrained and unconstrained training examples, using the determined weight vector for the current hash function (408). The system computes the residual as follows:

$$X = X - w_k w_k^T X.$$

This updating of the constrained and unconstrained training examples in the matrix X removes the contribution of the subspace of constrained and unconstrained training examples spanned by the projection direction defined by $w_k$.

While the above description describes both updating a residual and updating the current constraint weights, in other implementations, the system does not update both the residual and the current constraint weights. For example, in implementations where the system uses the matrix $M_k = X_l S_k X_l^T$ to determine the weight vector for the current has function, the system does not calculate the residual. As another example, in some implementations, the system does not update the current constraint weights S.

In some implementations, when the system is processing the last hash function in the sequence of hash functions, the system does not update the constraint weights or calculate the residual.

Figure 5:
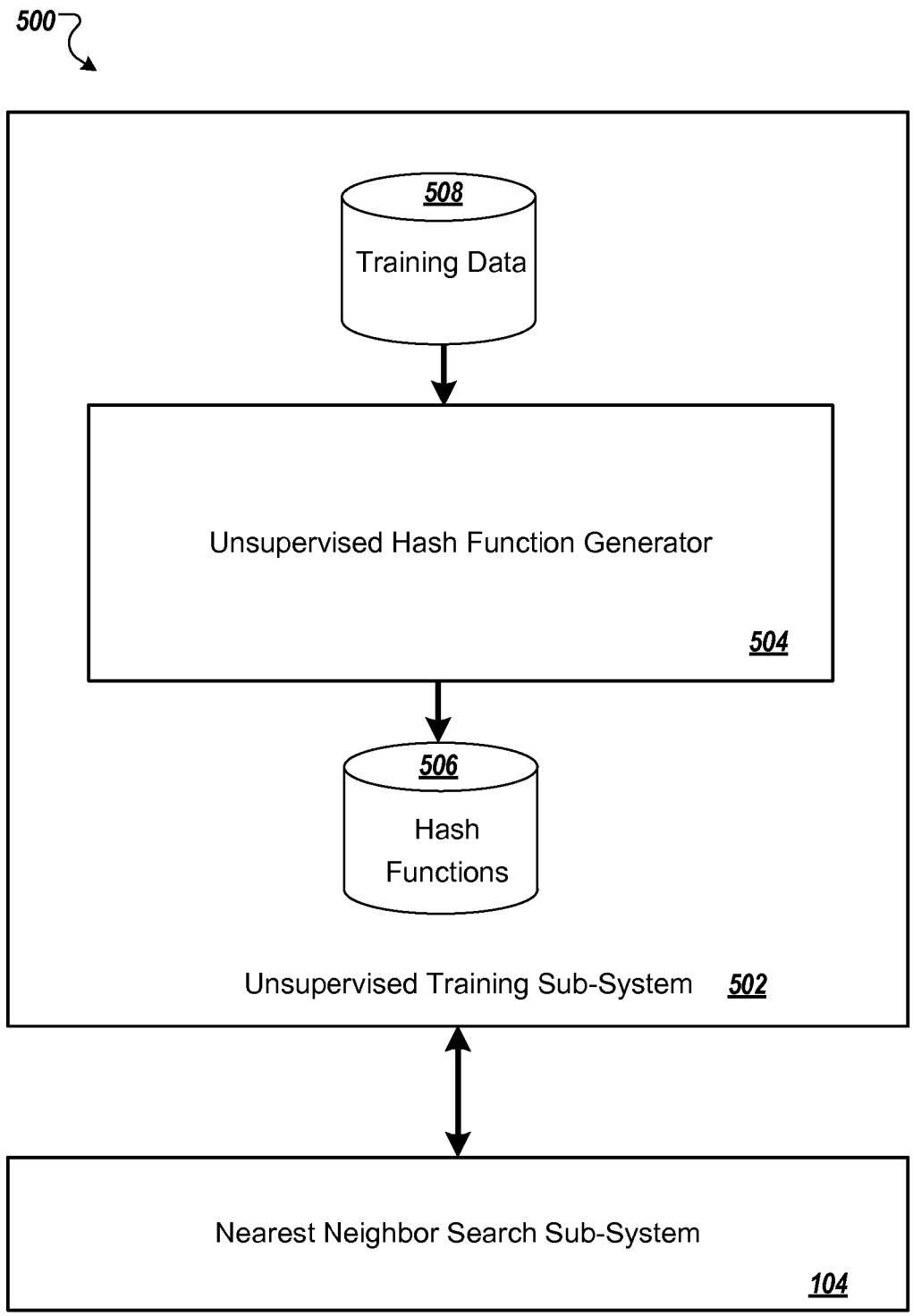
FIG. 5 is a block diagram of an example system, including an unsupervised training sub-system and a nearest neighbor search sub-system.

FIG. 5 is a block diagram of an example system 500, including an unsupervised training sub-system 502 and a nearest neighbor search sub-system 104. The system 500 is implemented in one or more computers.

The unsupervised training sub-system 502 includes a hash function generator 504 that generates hash functions 506 from training data 508. The nearest neighbor search sub-system 104 uses the generated hash functions, for example, as described above with reference to FIG. 1.

Unlike the semi-supervised training sub-system 102 described above with reference to FIG. 1, the unsupervised training sub-system 502 stores only training data 508 and does not store any static constraints on the training data. Instead, the unsupervised hash function generator 504 generates constraints for use in generating a particular hash function from the previously generated hash functions. The unsupervised hash function generator 504 generates these constraints to reduce thresholding errors.

Figure 6:
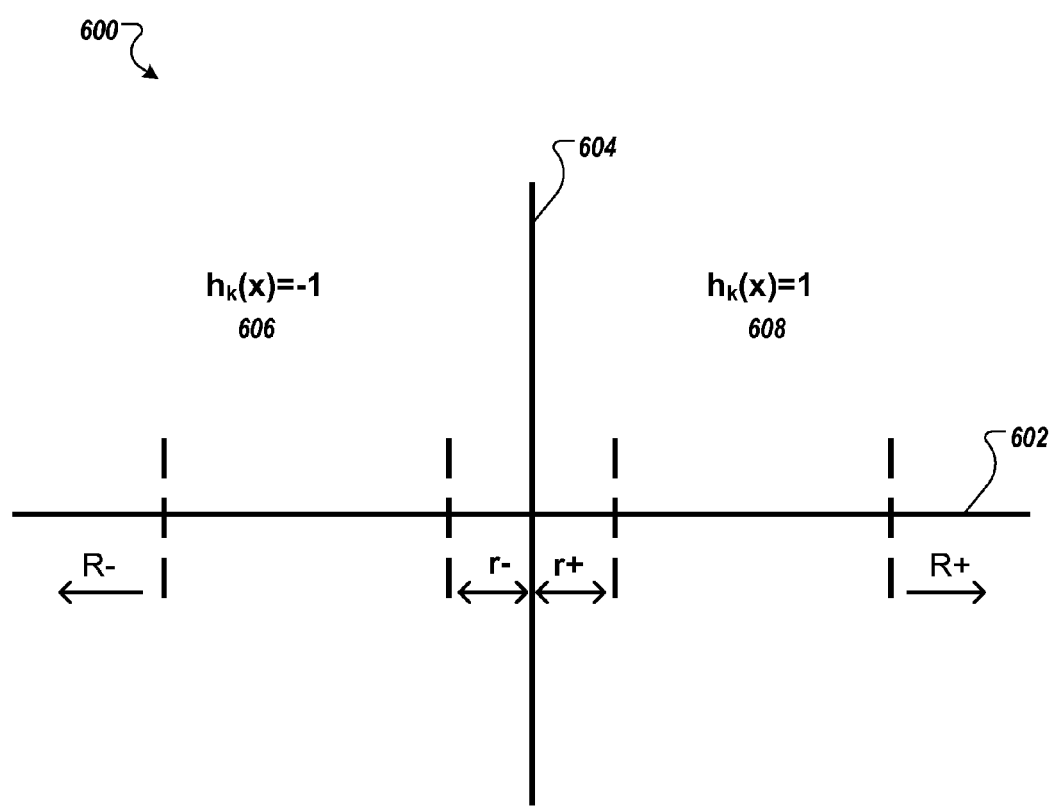
FIG. 6 illustrates an example of a one-dimensional axis onto which the features of items are projected using a weight vector that was determined for a hash function.

FIG. 6 illustrates an example of a one-dimensional axis 602 onto which the features of items are projected using a weight vector that was determined for a hash function. The vertical line 604 is the partition boundary, e.g., $w_k^T x=0$. Items whose projections fall to the left of the boundary 604 in region 606 are assigned a hash value $h_k(x)=-1$, while items whose projections fall to the right of the boundary 604 in region 608 are assigned a hash value $h_k(x)=1$.

The regions marked as r– and r+ are located very close to the boundary 604, and regions marked as R– and R+ are located far away from the boundary 604. The selection of the boundary 604 leads to possible thresholding errors, where items whose projections are close together are assigned different bits, or items whose projections are far apart are assigned the same bits. For example, points in r– and points in r+ are assigned different hash bits, even though their projections are quite close. Also, points in r– and R– and points in r+ and R+ are assigned the same hash bits, even though their projections are far apart.

To correct these thresholding errors, the unsupervised hash function generator determines a group of pseudo-neighbor pairs (M) and pseudo-non-neighbor pairs (C) resulting from the projection. The pseudo-neighbor pairs M are pairs of items that have different hash function values even though the projections for the items in the pair are close together. The pseudo-non-neighbor pairs C are pairs of items that have the same hash function value even though the projections for the items in the pair are far apart.

For example, in some implementations, the pseudo-neighbor pairs and pseudo-non-neighbor pairs are defined as follows:

$$M=\{(x_i,x_j)\}: h(x_i)\cdot h(x_j)=-1, |w^T(x_i-x_j)|\leq \epsilon$$

$$C=\{(x_i,x_j)\}: h(x_i)\cdot h(x_j)=1, |w^T(x_i-x_j)|\geq \zeta,$$

where $\epsilon$ and $\zeta$ are constants that define the regions described above.

Once the unsupervised hash function generator 504 generates the groups of pseudo-neighbor pairs M and the group of pseudo-non-neighbor pairs C, the unsupervised hash function generator 504 generates constraints corresponding to the requirement that pairs in the group of pseudo-neighbor pairs M be neighbors and pairs in the group of pseudo-non-neighbor pairs C be non-neighbors.

In some implementations, the unsupervised hash function generator 504 represents the constraints generated from hash function k as a constraint matrix $S_{MC}^k$, where the element s of $S_{MC}^k$ at column i and row j is defined as follows:

$$s = \begin{cases} 1 : (x_i, x_j) \in M \\ -1 : (x_i, x_j) \in C \\ 0 : \text{otherwise.} \end{cases}$$

Returning to FIG. 5, the unsupervised hash function generator 504 uses the constraints generated as described above to generate the hash functions 506. This is described in more detail below with reference to FIG. 7.

Figure 7:
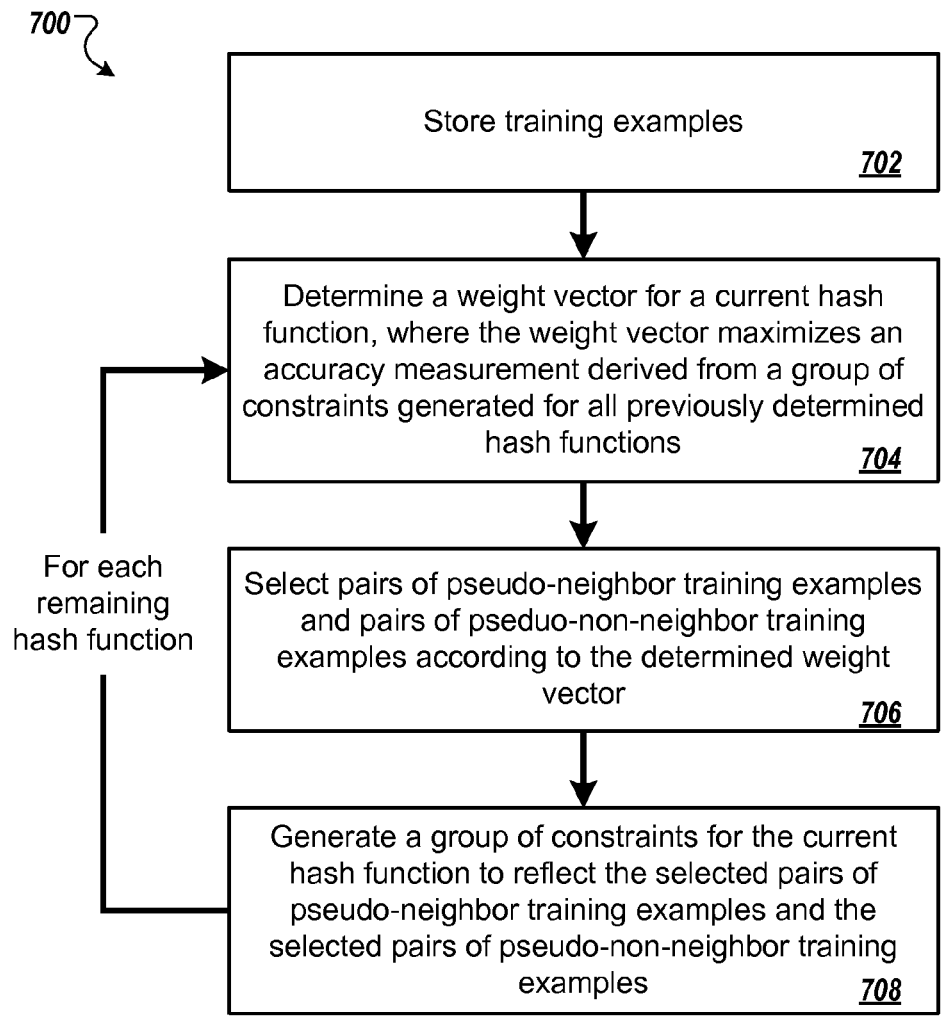
FIG. 7 is a flow chart of an example method for generating a sequence of hash functions in an unsupervised training environment.

FIG. 7 is a flow chart of an example method 700 for generating a sequence of hash functions in an unsupervised training environment. For convenience, the example method 700 is described in reference to a system that performs the method 700. The system can be, for example, the unsupervised training sub-system 502, described above with reference to FIG. 5.

The system stores a plurality of training examples (702), for example, as described above with reference to FIGS. 1 and 5. In some implementations, the system represents the training examples as a matrix X, where each column of X corresponds to the features of a particular training example.

The system then sequentially determines the weight vector for each function in the sequence of hash functions. As part of this process, the system also generates a group of constraints for each hash function from pairs of pseudo-neighbor training examples and pseudo-non-neighbor training examples. The constraints from previously determined hash functions are used to determine the weight vectors for subsequent hash functions. This means that each weight vector is selected to minimize potential thresholding errors arising from the previously selected weight vectors.

For each current hash function in the sequence of hash functions, the system does the following. First, the system determines a weight vector for the current hash function (704). The weight vector maximizes an accuracy measure derived from a group of constraints generated for all previously determined hash functions.

In some implementations, the system determines the weight vector by generating an adjusted covariance matrix from the training examples and the previously determined constraints, and then extracting the first eigenvector, or generating an approximate eigenvector, of the adjusted covariance matrix.

For example, the adjusted covariance matrix can be generated according to the following formula:

$$M_k = \sum_{i=0}^{k-1} \lambda^{k-1} X_{MC}^i S_{MC}^i {X_{MC}^i}^T,$$

where $S_{MC}^i$ is a matrix corresponding to the constraints generated from the weights for the hash function i, for example, as described above with reference to FIG. 6. $X_{MC}^i$ is a pseudo-constrained training example matrix that includes all of the training examples that are in either in the group of pseudo-neighbor pairs of training examples M or the group of pseudo-non-neighbor pairs of training examples C used to generate the constraints for the hash function i. X is a matrix that includes all of the training examples, for example, as described above. $\lambda$ is a decay factor that is used to exponentially decay the contribution of old constraint matrices. $\lambda$ has a value that is less than 1.

In other implementations, the system determines a weight vector that both maximizes an accuracy measure derived from a group of constraints generated for all previously determined hash functions and maximizes a variance measure derived from a variance in projections resulting from applying the determined weight vector to the training examples. In these implementations, the system generates an adjusted covariance matrix from the training examples and the previously determined constraints and all of the training examples, and then determines the weight vector by extracting the first eigenvector, or generating an approximate eigenvector, of the adjusted covariance matrix.

For example, the adjusted covariance matrix can be generated according to the following formula:

$$M_k = \sum_{i=0}^{k-1} \lambda^{k-1} X_{MC}^i S_{MC}^i {X_{MC}^i}^T + \eta X X^T,$$

where $S_{MC}^i$, $X_{MC}^i$, and $\lambda$ have the values described above, and $\eta$ has the value described above with reference to FIGS. 3 and 4.

If the current hash function is the first hash function in the sequence of hash functions, the system can use a default group of constraints, for example, a set of no constraints, to determine the weight vector for the first hash function, for example, using the adjusted covariance matrix given above. Alternatively, the system can select the weight vector for the first hash function at random, for example, by randomly selecting a value for each weight in the weight vector.

The system selects pairs of pseudo-neighbor training examples and pairs of pseudo-non-neighbor training examples according to the determined weight vector for the current hash function (706), for example, as described above with reference to FIG. 6. The system generates a group of constraints for the current hash function to reflect the selected pairs of pseudo-neighbor training examples and the selected pairs of pseudo-non-neighbor training examples, for example, as described above with reference to FIG. 6.

In some implementations, where the selected weight vectors also maximize variance, the system updates X after each iteration by computing the residual, e.g., $$X = X - w_k w_k^T X,$$

as described in more detail above with reference to FIG. 4.

In some implementations, the system does not explicitly store the individual constraint matrices and pseudo-constrained training matrices, i.e., the matrices having subscripts or superscripts 0 through k−1 that are used to calculate the hash function and matrices for iteration k. In these implementations, the system instead does incremental updates at the end of each iteration.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a non-transitory computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
one or more computers configured to perform operations comprising:
storing a plurality of constrained training examples, a plurality of first training examples, and a plurality of constraints for the constrained training examples, wherein, for each constrained training example, there is at least one constraint in the plurality of constraints, and the constraint either identifies a particular other constrained training example as a neighbor of the constrained training example or identifies a particular other constrained training example as a non-neighbor of the constrained training example, wherein the plurality of first training examples is initialized to include the constrained training examples and one or more non-constrained training examples for which there is no constraint in the plurality of constraints;

generating an adjusted covariance matrix from the plurality of constrained training examples, the plurality of first training examples, and the plurality of constraints, wherein the adjusted covariance matrix is generated by adding an accuracy term and a regularizer term, wherein the accuracy term is derived from the constrained training examples and the constraints, and wherein the regularizer term represents variance in projections that result from applying a weight vector to the first training examples; and generating an ordered sequence of hash functions from the adjusted covariance matrix, wherein each hash function defines a mapping of features of an item to a corresponding bit in an ordered sequence of bits, wherein the hash function for a particular bit determines a value of the particular bit according to a respective weight vector for the hash function.

2. The system of claim 1, wherein the accuracy term corresponds to an accuracy measure derived from a number of constraints satisfied by the weight vector, a number of constraints not satisfied by the weight vector, and a constraint weight for each constraint.

3. The system of claim 2, wherein the accuracy term is $X_I S_k X_I^T$, the regularizer term is $\eta X X^T$, and the adjusted covariance matrix is derived by adding the accuracy term and the regularizer term, wherein $X_I$ is a matrix of feature vectors of the constrained training examples, $S_k$ is a matrix of the constraint weights, and X is a matrix of feature vectors of the plurality of training examples.

4. The system of claim 2, wherein the accuracy term is $X_I S_k X_I^T$, the regularizer term is $\eta X X^T$, and the adjusted covariance matrix is derived by adding the accuracy term and the regularizer term, wherein $X_I$ is a matrix of feature vectors of the constrained training examples, $S_k$ is a matrix of the constraint weights, and X is a matrix of feature vectors of the plurality of training examples.

5. The system of claim 1, wherein generating an ordered sequence of hash functions from the adjusted covariance matrix comprises determining a weight vector for each hash function in the sequence of hash functions by determining one eigenvector for the adjusted covariance matrix for each hash function in the sequence of hash functions.

6. The system of claim 5, wherein determining the eigenvectors comprises extracting eigenvectors from the adjusted covariance matrix.

7. The system of claim 5, wherein determining the eigenvectors comprises determining approximate eigenvectors.

8. The system of claim 1, wherein generating an ordered sequence of hash functions from the adjusted covariance matrix comprises sequentially determining a weight vector for each hash function in the sequence of hash functions.

9. The system of claim 1, wherein generating an ordered sequence of hash functions from the adjusted covariance matrix comprises selecting a weight vector for each hash function so that a matrix W of the selected weight vectors optimizes the equation $$Q(W) = \frac{1}{2}tr\{W^T[X_l S X_l^T + \eta X X^T]W\},$$

where $X_l$ is a matrix of feature vectors of the constrained training examples, S is a matrix of constraint weights, and X is a matrix of feature vectors of the plurality of training examples.

10. The system of claim 1, wherein the operations further comprise performing a nearest neighbor search using the ordered sequence of hash functions.

11. The system of claim 5, wherein the operations further comprise performing a nearest neighbor search using the ordered sequence of hash functions.

12. A computer-implemented method, comprising:
  storing a plurality of constrained training examples, a plurality of first training examples, and a plurality of constraints for the constrained training examples, wherein, for each constrained training example, there is at least one constraint in the plurality of constraints, and the constraint either identifies a particular other constrained training example as a neighbor of the constrained training example or identifies a particular other constrained training example as a non-neighbor of the constrained training example, wherein the plurality of first training examples is initialized to include the constrained training examples and one or more non-constrained training examples for which there is no constraint in the plurality of constraints;
  generating, with one or more computers, an adjusted covariance matrix from the plurality of constrained training examples, the plurality of first training examples, and the plurality of constraints, wherein the adjusted covariance matrix is generated by adding an accuracy term and a regularizer term, wherein the accuracy term is derived from the constrained training examples and the constraints, and wherein the regularizer term represents variance in projections that result from applying a weight vector to the first training examples; and
  generating, with the one or more computers, an ordered sequence of hash functions from the adjusted covariance matrix, wherein each hash function defines a mapping of features of an item to a corresponding bit in an ordered sequence of bits, wherein the hash function for a particular bit determines a value of the particular bit according to a respective weight vector for the hash function.

13. The method of claim 12, wherein the accuracy term corresponds to an accuracy measure derived from a number of constraints satisfied by the weight vector, a number of constraints not satisfied by the weight vector, and a constraint weight for each constraint.

14. The method of claim 13, wherein the accuracy term is $X_l S_k X_l^T$, the regularizer term is $\eta X X^T$, and the adjusted covariance matrix is derived by adding the accuracy term and the regularizer term, wherein $X_l$ is a matrix of feature vectors of the constrained training examples, $S_k$ is a matrix of the constraint weights, and X is a matrix of feature vectors of the plurality of training examples.

15. The method of claim 13, wherein the accuracy term is $X_l S_k X_l^T$, the regularizer term is $\eta X X^T$, and the adjusted covariance matrix is derived by adding the accuracy term and the regularizer term, wherein $X_l$ is a matrix of feature vectors of the constrained training examples, $S_k$ is a matrix of the constraint weights, and X is a matrix of feature vectors of the plurality of training examples.

16. The method of claim 12, wherein generating an ordered sequence of hash functions from the adjusted covariance matrix comprises determining a weight vector for each hash function in the sequence of hash functions by determining one eigenvector for the adjusted covariance matrix for each hash function in the sequence of hash functions.

17. The method of claim 16, wherein determining the eigenvectors comprises extracting eigenvectors from the adjusted covariance matrix.

18. The method of claim 16, wherein determining the eigenvectors comprises determining approximate eigenvectors.

19. The method of claim 12, wherein generating an ordered sequence of hash functions from the adjusted covariance matrix comprises sequentially determining a weight vector for each hash function in the sequence of hash functions.

20. The method of claim 12, wherein generating an ordered sequence of hash functions from the adjusted covariance matrix comprises selecting a weight vector for each hash function so that a matrix W of the selected weight vectors optimizes the equation $$Q(W) = \frac{1}{2}tr\{W^T[X_l S X_l^T + \eta X X^T]W\},$$

where $X_l$ is a matrix of feature vectors of the constrained training examples, S is a matrix of constraint weights, and X is a matrix of feature vectors of the plurality of training examples.

21. The method of claim 12, further comprising performing a nearest neighbor search using the ordered sequence of hash functions.

22. The method of claim 16, further comprising performing a nearest neighbor search using the ordered sequence of hash functions.

23. A non-transitory computer storage medium encoded with a computer program, the program comprising instructions that when executed by data processing apparatus cause the data processing apparatus to perform operations comprising:
  storing a plurality of constrained training examples, a plurality of first training examples, and a plurality of constraints for the constrained training examples, wherein, for each constrained training example, there is at least one constraint in the plurality of constraints, and the constraint either identifies a particular other constrained training example as a neighbor of the constrained training example or identifies a particular other constrained training example as a non-neighbor of the constrained training example, wherein the plurality of first training examples is initialized to include the constrained training examples and one or more non-constrained training examples for which there is no constraint in the plurality of constraints;
  generating an adjusted covariance matrix from the plurality of constrained training examples, the plurality of first training examples, and the plurality of constraints, wherein the adjusted covariance matrix is generated by adding an accuracy term and a regularizer term, wherein the accuracy term is derived from the constrained training examples and the constraints, and wherein the regularizer term represents variance in projections that result from applying a weight vector to the first training examples; and generating an ordered sequence of hash functions from the adjusted covariance matrix, wherein each hash function defines a mapping of features of an item to a corresponding bit in an ordered sequence of bits, wherein the hash function for a particular bit determines a value of the particular bit according to a respective weight vector for the hash function.

24. The computer storage medium of claim 23, wherein the accuracy term corresponds to an accuracy measure derived from a number of constraints satisfied by the weight vector, a number of constraints not satisfied by the weight vector, and a constraint weight for each constraint.

25. The computer storage medium of claim 24, wherein the accuracy term is $X_l S_k X_l^T$, the regularizer term is $\eta XX^T$, and the adjusted covariance matrix is derived by adding the accuracy term and the regularizer term, wherein $X_l$ is a matrix of feature vectors of the constrained training examples, $S_k$ is a matrix of the constraint weights, and X is a matrix of feature vectors of the plurality of training examples.

26. The computer storage medium of claim 24, wherein the accuracy term is $X_l S_k X_l^T$, the regularizer term is $\eta XX^T$, and the adjusted covariance matrix is derived by adding the accuracy term and the regularizer term, wherein $X_l$ is a matrix of feature vectors of the constrained training examples, $S_k$ is a matrix of the constraint weights, and X is a matrix of feature vectors of the plurality of training examples.

27. The computer storage medium of claim 23, wherein generating an ordered sequence of hash functions from the adjusted covariance matrix comprises determining a weight vector for each hash function in the sequence of hash functions by determining one eigenvector for the adjusted covariance matrix for each hash function in the sequence of hash functions.

28. The computer storage medium of claim 27, wherein determining the eigenvectors comprises extracting eigenvectors from the adjusted covariance matrix.

29. The computer storage medium of claim 27, wherein determining the eigenvectors comprises determining approximate eigenvectors.

30. The computer storage medium of claim 23, wherein generating an ordered sequence of hash functions from the adjusted covariance matrix comprises sequentially determining a weight vector for each hash function in the sequence of hash functions.

31. The computer storage medium of claim 23, wherein generating an ordered sequence of hash functions from the adjusted covariance matrix comprises selecting a weight vector for each hash function so that a matrix W of the selected weight vectors optimizes the equation $$Q(W) = \frac{1}{2} tr\{W^T [X_l S X_l^T + \eta XX^T] W\},$$

where $X_l$ is a matrix of feature vectors of the constrained training examples, S is a matrix of constraint weights, and X is a matrix of feature vectors of the plurality of training examples.

32. The computer storage medium of claim 23, further configured to perform operations comprising performing a nearest neighbor search using the ordered sequence of hash functions.

33. The computer storage medium of claim 27, further configured to perform operations comprising performing a nearest neighbor search using the ordered sequence of hash functions.

* * * * *